April 16, 1963

C. R. KOLLER 3,085,922

POROUS FLEXIBLE SELF-SUPPORTING SHEET
MATERIAL AND METHOD OF MAKING SAME

Filed Jan. 19, 1959

INVENTOR
CHARLES R. KOLLER

BY *H. William Petry*

ATTORNEY

United States Patent Office 3,085,922
Patented Apr. 16, 1963

3,085,922
POROUS FLEXIBLE SELF-SUPPORTING SHEET MATERIAL AND METHOD OF MAKING SAME
Charles Richard Koller, Wilmington, Del., assignor to E. I. du Pont de Nemours and Company, Wilmington, Del., a corporation of Delaware
Filed Jan. 19, 1959, Ser. No. 787,662
10 Claims. (Cl. 154—45)

This invention relates to novel structures comprising porous self-supporting fibrous sheet material, and more particularly to continuous sheeting which is adaptable to a wide variety of styling possibilities and to processes for the production of said continuous sheeting.

It is known that there may be prepared cushions and other structures composed of a layer of parallel fibers having one or both faces attached to a backing layer for support and/or confinement. It is also known to prepare pile type structures by application of flock fibers to a backing layer such that the flock is individually attached to the backing layer leaving one end of each fiber free. None of these prior art structures, however, is adaptable for more than one particular end use.

It is an object of this invention to provide a novel structure comprising a selected combination of parallel filamentary structures and a binder such that the filamentary structures and binder cooperate to produce a self-supporting fibrous sheeting having certain unique properties not available heretofore. It is also an object of this invention to provide a continuous rollable self-supporting sheet which is adaptable to be used in a wide variety of dissimilar applications. A further object is to provide processes for the production of continuous, rollable, self-supporting sheeting. Particular objects of this invention include the provision of continuous sheeting material which may be used as such, or may be readily converted for use as carpeting, floor tile, artificial leather, velvets, suedes, fleeces, cushioning, artificial furs, and the like. Other objects will be apparent from the description of the invention given below.

The above objects are accomplished in accordance with this invention by providing a porous, self-supporting, fibrous article comprising substantially parallelized filamentary structures distributed throughout the article at an angle to the plane of the face of the article greater than about 10°, the structures being attached at a plurality of contact points throughout the article. More particularly, these objects are accomplished by providing a porous, self-supporting, wrappable, fibrous sheet material comprising at least a majority of substantially parallelized filamentary pile members uniformly distributed throughout the sheet, at an angle to the plane of the face of the sheet greater than about 10°, which pile members are attached to each other by a binder at a plurality of contact points, said sheet material containing at least about 0.50% binder based on the weight of pile members, with the pile member density in the sheet being at least about 0.50 lb.ft.$^3$ and the air volume in the sheet being at least about 25% by volume of the sheet with substantially uniform distribution of binder and air throughout the volume between the pile members.

The binder is present in an amount sufficient to hold the fibers of the sheet in self-supporting fashion, preferably uniformly distributed throughout the sheet. The binder, however, may be present in an amount so that a sheet having binder either uniformly or non-uniformly distributed throughout is produced.

The faces of the sheet material are composed essentially of fiber ends. The ends of substantially all fibers in the sheet touch at least one face, whereas both ends of a substantial number of the fibers in the sheet touch both faces, respectively.

Sheet materials which are of a thickness less than about one inch and can be wrapped and unwrapped around a cylinder of small diameter without splitting are particularly desirable for conversion to certain useful objects such as thin tile, fabric underlinings and the like. A sheet material characterized by such wrappability is capable of greatly facilitated handling during subsequent treatment over rolls, guides and the like without loss of fibers or splitting. Another preferred form of sheet material is that wherein the sheet has a minimum tensile strength of about 0.005 lb./in./oz./yd.$^2$. The porous self-supporting sheet of this invention preferably contains at least about 50% by number of substantially parallelized pile members, but preferably the number is higher where high density and bulk is desired in the final product.

By "substantially parallelized," it is meant that the filamentary pile members may be crimped, bulked, or of some other irregular configuration, but that the mean axes of individual pile members are substantially parallel. This orientation may be further illustrated by considering individual pile members to be surrounded by a circumscribing envelope or cylinder; the mean axes of these envelopes are substantially parallel. The length of the individual pile members is determined by measuring the straight line distance between the fiber ends, for either crimped or uncrimped fibers.

By the term sheet is meant the well-known definition, i.e., an article having greater length and width than thickness.

The face of the sheet is that surface toward which the pile members are oriented and which exposes a higher percentage of surface area than any side. Often this constitutes the cut surface, i.e., the surface at which the cut producing the sheet-like article is made.

The novel sheet material of this invention may be prepared either batch-wise or continuously by a process comprising preparing a self-supporting body containing filamentary structures oriented substantially parallel and cutting said body at an angle of at least 10° transverse to the plane of the filamentary structures to provide a porous, self-supporting sheet-like article. The filamentary structures of the self-supporting body are preferably attached at a plurality of contact points uniformly throughout the body, preferably by a binder composition for the filamentary structures.

One suitable method comprises forming a plurality of bodies containing substantially parallelized filamentary structures, placing the bodies in a mold while keeping said filamentary structures parallelized to form a block, impregnating the block with a binder composition, curing the binder, and cutting the resulting block at an angle of at least 10° to the plane of orientation of the filamentary structures to obtain the porous, self-supporting sheet material of this invention.

A typically suitable method for preparing the novel continuous sheeting of this invention involves carding staple fibers into a web of substantially parallel fibers or a sliver of parallel fibers, stacking the web or the sliver in a perforated mold of the desired size, keeping all fibers parallel during the operation, impregnating the block of parallel fibers with latex or a solution of the desired binder, removing excess binder from the fiber block, preferably by suction, and forcing hot air through the block from end to end to dry and/or cure the binder matrix. The bonded fiber block is then removed from the mold and wafers or sheets of the parallel fibers on end are cut from the block by slicing across the end of the block perpendicular to the axis of the fibers. The desired angle of the filamentary structures may be achieved by varying the angle of the cut or by placing the strips in the mold at an angle and then making the cut on a plane parallel to the face of the block, transversely to the filamentary structures. The resulting bonded parallel fibers in the form of self-supporting wafers or sheeting may, if desired, be cemented to one or more suitable backing materials depending on the particular end use desired.

The novel continuous sheeting of this invention may be prepared continuously by forming filamentary structures into a body of substantially parallel filamentary structures, cutting strips from the body at an angle transverse to the parallel filamentary structures, placing the strips into a mold to form a block containing substantially parallelized filamentary structures, impregnating the block with a binder composition, treating the block to dry and/or cure the binder composition, extruding the dried block from the mold continuously and cutting strips continuously from the block at an angle transverse to the parallel fibers so that the resulting sheet material contains substantially parallel filamentary pile members oriented at an angle of at least about 10° to the plane of the cutting surface. Alternatively, a binder composition may be added to the body, which may then be heated, prior to cutting the body into strips. If excess binder is added during the impregnation step, it may be removed by suction or by other means prior to the treating procedure. The block may be sliced into wafers of any desired lengths and treated further or rolled up and prepared for shipment. However, the block may be used as such for other purposes, such as cushions and the like.

Any of the starting materials may be pleated into parallel rows prior to impregnation with the binder, for example, by pleating the material into folds and stuffing the folds into a mold or by pleating the material directly into a mold. The end portions may be cut off before or after the impregnation step to provide a block of parallelized filamentary structures from which the continuous porous sheeting of this invention may be cut.

The sheeting of this invention may also be prepared by forming a rotating shell of bonded fiber lengths, the fibers extending radially, prepared according to the above procedures and slicing long lengths from the shell by use of a band knife, doctor blade or the like.

Single sheets of the sheeting of this invention may be prepared by preparing a card web of parallel fibers by cross-laying the fibers as nearly perpendicular as possible to the forward motion of the conveyor belt, adding a sufficient binder to bond the web, slitting the web with a cutter transverse to the fibers, passing each strip through a twisted guide and rotating each strip so that the fibers are perpendicular to the original plane of the web, and adding additional binder as desired to form a continuous sheet which may be further treated, or rolled for shipment.

The body of parallel filamentary structures may be fed to a cutting means before or after impregnation with the binder composition and may also be fed horizontally or vertically into a horizontal or vertical mold as desired. Vertical molding tends to eliminate any side-to-side variation in binder density.

The molds for preparing blocks from the transverse strips may be of any desired shape, such as circular, square, rectangular, triangular, and may be formed in any desired configuration from continuously moving belts. Also, in continuous methods, the mold of desired shape may be fitted with moving belts at one or more surfaces to move the block through the mold continuously. The mold is preferably perforated to allow passage of excess binder.

Both the batch and continuous processes may be initiated by a large number of starting materials; e.g. by making a card web of substantially parallel staple fibers or preparing the body of substantially parallel filamentary structures, from a warp of sliver, top, roping, roving, tow, stuffer box crimped tow, steam bulked tow, steam crimped continuous filament yarn, twist set-back twisted continuous filament yarn, two component-bulky continuous filament yarn, spun yarns, and many others. Any of the above procedures may then be followed to prepare the sheet material of this invention.

In preparing the novel continuous sheeting of this invention a wide variety of polymeric compositions may be employed. Typical of the fibers and filaments which may be employed in this invention are those made of polyamides, such as poly(hexamethylene adipamide), poly(hexamethylene sebacamide), polycaproamide, and copolyamides, polyesters and copolyesters such as condensation products of ethylene glycol with terephthalic acid, ethylene glycol with a 90/10 mixture of terephthalic/isophthalic acids, ethylene glycol with a 98/2 mixture of terephthalic/5-(sodium sulfo)-isophthalic acids, and trans-p-hexahydroxylylene glycol with terephthalic acid, polyacrylonitrile, copolymers of acrylonitrile with other monomers such as vinyl acetate, vinyl chloride, methyl acrylate, vinyl pyridine, sodium styrene sulfonate, terpolymers of acrylonitrile/methylacrylate/sodium styrene sulfonate made in accordance with U.S. Patent 2,837,501, vinyl and vinylidene polymers and copolymers, polycarbonates, polyurethanes, polyesteramides, polyethylenes, polypropylenes, fluorinated ethylene polymers and copolymers, cellulose derivatives, such as cellulose acetate, cellulose triacetate, composite filaments such as, for example, a sheath of polyamide around a core of polyester as described in the copending application of Breen, S.N. 621,443, filed November 9, 1956, now abandoned, and self-crimped composite filaments, such as two acrylonitrile polymers differing in ionizable group content cospun as described in the copending application of Taylor, S.N. 640,722, filed February 18, 1957, now abandoned, regenerated cellulose, cotton, wool, glass, and the like. Blends of two or more synthetic or natural fibers may be used, as well as blends of synthetic and natural.

The self-supporting sheet material may be prepared from a wide variety of forms of fibers and filaments, having any of the above-mentioned compositions, such as, for example, continuous monofilaments, continuous multifilaments, carded webs, warp sliver, top, roping, roving, tow, bulked tow, bulked continuous filament yarn, spun yarn, batts, felts, papers and other non-woven webs, and the like. The fibers and filaments used as raw material may be either crimped or uncrimped, bulked or unbulked, or drawn or undrawn.

The binder to be used in the self-supporting sheeting of this invention may be either soluble or insoluble depending upon the use desired. If it is desired to remove the binder a soluble binder will be employed, which may be either organic-soluble, or water-soluble. Suitable organic-soluble binders include natural rubber or synthetic elastomers (e.g. chloroprene, butadiene-styrene copolymers, butadiene-acrylonitrile copolymers), which may be used in the form of a latex dispersion or emulsion or in the form of a solution, vinyl acetate, acrylic polymers such as ethyl acrylate, methyl acrylate, acrylic acid/acrylic ester copolymers and methyl methacrylate, cellulose acetate, polyester resins such as ethylene terephthalate/ethylene isophthalate copolymers, polyurethanes such as the polymer from piperazine and ethylene bis-chloroformate, methoxymethyl polyamides and polyvinyl chloride/vinylidene chloride copolymer latices. Alcohol soluble polyamide resins are also suitable organic-soluble binders. Suitable water-soluble binders include materials such as polyvinyl alcohol, sodium alginate, and carboxymethyl cellulose. Suitable binders which are insoluble in organic solvents include polyvinyl chloride, poytetrafluoroethylene and urea-formaldehyde resin latices.

When a soluble binder is employed, it may be leached out after preparation of the bonded fibrous sheeting so that only the parallel fibers remain. However, this will normally be done by first bonding one face of the bonded fibrous sheet to a suitable backing using an inert cement and then dissolving out the original binder. There remains a sheet of parallel fibers on end, substantially all of the lower tips of which are attached to a backing layer, thus leaving substantially all of the upper tips of the fibers free to bend in any direction and to simulate the action of pile fibers. Such products may be used for velvets, fleeces, carpets, and the like.

An altternative use when employing a soluble binder is to leach out the binder with a solvent without applying a backing material. In this instance the fibrous sheet disintegrates leaving only flock fibers. This method is useful for producing flock of accurate and uniform size.

When employing an insoluble binder, the self-supporting sheeting may be used as is, or it may be attached either to a rigid or to a flexible membrane or fabric (e.g. woven, knitted, non-woven fabrics, films, and the like). Such supported structures may be employed as resilient abrasion resistant floor tile, suede leather substitutes, covering for tables, luggage, and tool handles and the like.

In a preferred embodiment of this invention an insoluble binder is employed to provide the novel continuous self-supporting sheeting without the necessity of removing the binder which has been so often the case heretofore. The selection of the proper composition and amount of insoluble binder serves to make the sheet material self-supporting without the need for any backing material.

In another preferred embodiment of this invention the fiber and binder are selected from the same chemical classification (i.e. wherein both binder and fiber have the same functional groups), which leads to a self-supporting sheet which may be dyed uniformly with only one dyestuff. For example, the fibers may be composed of polyhexamethylene adipamide and the binder may be composed of N-methoxymethyl polyhexamethylene adipamide resin, or the binder may be composed of an alcohol-soluble terpolyamide resin formed by condensing together caprolactam, hexamethylene diamine, adipic acid and sebacic acid, such that there are equal proportions of polycaproamide, polyhexamethylene adipamide and polyhexamethylene sebacamide in the terpolymer.

Regardless of whether a soluble or insoluble binder is employed, the binder may be left in the final sheeting of this invention, or it may be partially or completely removed, depending on the end use desired for the sheeting.

Figure 1:
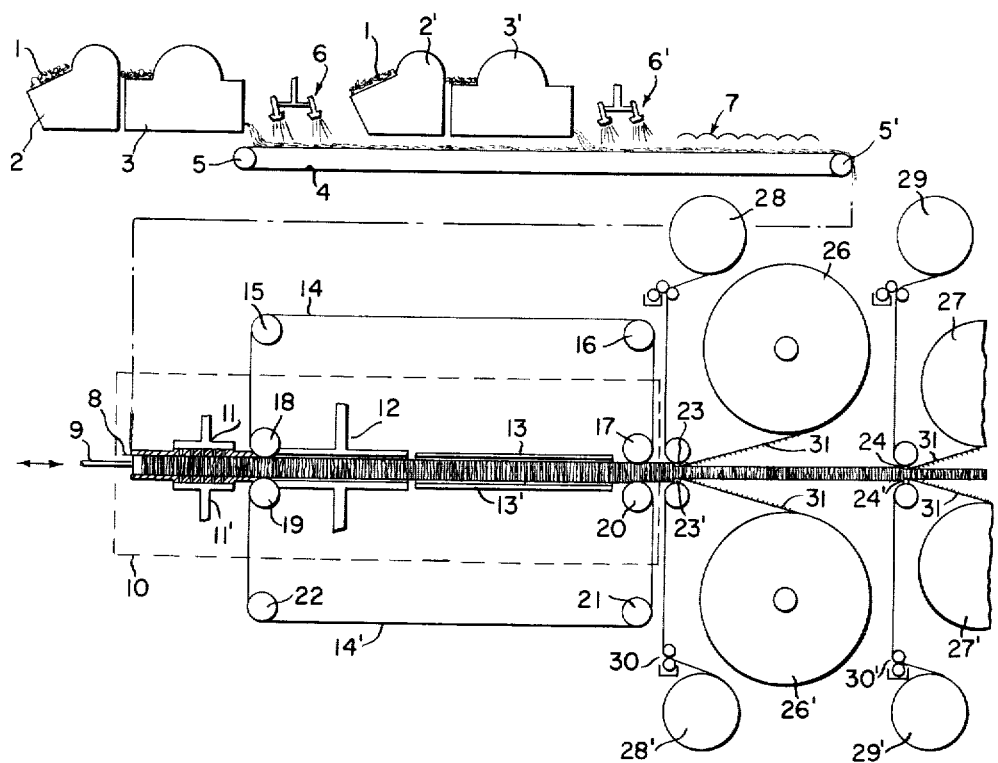
FIGURE 1 shows a schematic process for the continuous preparation of the novel sheeting of this invention.

The novel sheet material of this invention may be prepared by forming a web of parallel staple fibers by passing staple fibers 1 from feeders 2 and 2' through garnetting machines 3 and 3' onto the conveyor belt 4 driven by drive rolls 5 and 5'. Binder composition is sprayed onto the web by sprays 6 and 6'. The web is then dried under infra-red lamps 7 and fed vertically downward into a reciprocating cutter 8. The cut-off sections are forced by reciprocating ram 9 into a forming chamber 10 where the sections are impregnated with a latex composition fed through inlets 11 and 11'. The impregnated block is fed through a vacuum chamber 12 to remove excess latex and then passed between dielectric heating plates 13 and 13' to dry the block and complete the bonding. The block is fed through the forming chamber by means of carrier belts 14 and 14' driven by drive rolls 15, 16, 17, 18, 19, 20, 21, 22. Thin wafers or sheets can be then slit from the resulting block by horizontal knife cutters 23, 23', 24, 24' and other knives (not shown). The self-supporting sheets (not shown) may be rolled up for shipment directly onto wind-up rolls (not shown) or, as shown in the drawing, can be cemented to backing material fed from feed rolls 28, 28', 29 and/or 29' to which an adhesive has been added by adhesive applicator rolls 30 and 30' and wound up as 31 onto rolls 26, 26', 27, 27' and others (not shown).

Figure 2:
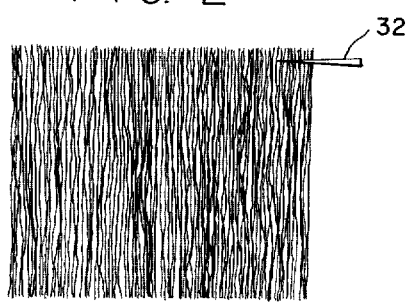
FIGURE 2 illustrates a block of parallelized filamentary structures from which the sheet material of this invention may be prepared.
Figure 3:
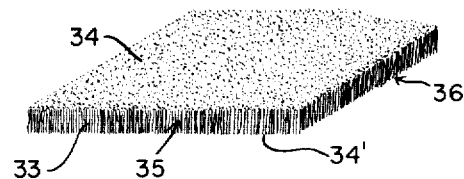
FIGURE 3 illustrates the sheet material of this invention.

FIGURE 3 illustrates the sheet material cut from the block of FIGURE 2 by knife 32. Looking at sides 35 and 36 pile members 33 are seen to be substantially parallelized and oriented toward faces 34 and 34'.

Figure 4:
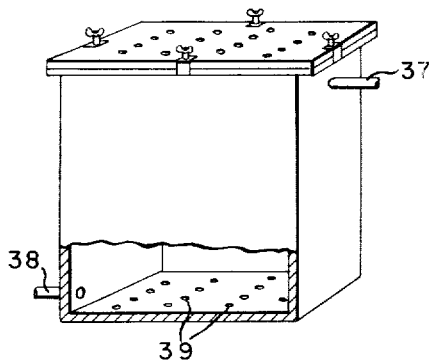
FIGURE 4 illustrates a typical mold in which a block of parallelized filamentary structures may be prepared.

The mold in which the block of FIGURE 2 may be prepared is shown in FIGURE 4, which illustrates inlet and outlet tubes 37 and 38, respectively, as well as perforations 39 for permitting passage of the binder composition.

Figure 5:
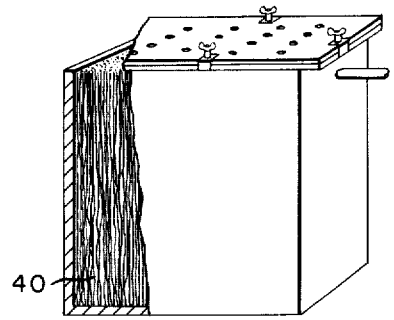
FIGURE 5 illustrates the mold of FIGURE 4 filled with a body of parallelized filamentary structures.

FIGURE 5 illustrates the mold of FIGURE 4 filled with a body of parallelized filamentary structures 40, prior to the introduction of the binder composition.

In continuous operation, density of fibers is regulated by adjusting the ratio of the rate of feed of strips to the mold and the rate of wind-up of the final product sheeting. In both continuous and batch operation, density of fibers is regulated by the packing pressure, whether by hand, reciprocating ram or the like.

The following examples illustrate specific embodiments of this invention without intending to limit the same. All parts and proportions are by weight unless otherwise specified. The flexural rigidity of the sheets is measured by the cantilever test of ASTM method D 1388–55T for measuring "Stiffness of Fabrics." The results are expressed in gram-centimeters. The tensile strength of the sheets is measured according to the cut strip method of ASTM test D 1117–57 (Section 6) for testing of non-woven fabrics, excepting that the rate of elongation of the sample is 3 inches/minute, instead of 12 inches/minute. The results are expressed in lbs./in./oz./yd.$^2$. Fiber density is the weight of fibers in a given volume.

EXAMPLE I

A warp sheet of 120 ends of continuous filament polyhexamethylene adipamide yarn (each yarn 1000 denier, 68 filaments, ½ Z twist and having a Y cross section) is bulked by feeding at a rate of 65 yards/minute through a slit jet using steam at 400° F. and 24 p.s.i. (pounds per square inch) as the turbulent fluid using the process described by Hallden and Murenbeeld in copending U.S. application S.N. 781,549, filed December 19, 1958. The sheet of warp ends is cut into 10" x 15" sections and fifty of these sections stacked in a steel mold, 12" deep x 10" wide, on top of each other, so that the direction of each warp end lays parallel to the depth of the mold, and each end protrudes from the top and bottom of the mold. The protruding fibers are trimmed leaving approximately 715 grams of fiber in the mold. Two perforated metal screens are placed over the top and bottom sections of the mold and cover plates fitted with inlet and outlet pipes are attached using air tight gaskets to the top and bottom of the mold over the screens.

The binder used in this experiment is an alcohol soluble terpolymer formed by condensing together caprolactam, hexamethylene diamine, adipic acid and sebacic acid, such that there are substantially equal proportions of polycaproamide, polyhexamethylene adipamide and polyhexamethylene sebacamide in the terpolymer. A solution of 4% by weight terpolymer in 80/20 alcohol/water mixture by volume is drawn through the mold from bottom pipe to top pipe by means of suction applied to the top pipe and allowed to drain back through the mold out the bottom pipe by gravity so that the contact time of binder with fibers is about 5 minutes. Hot dry compressed air (300° F.) is passed through the mold from top to bottom until all the volatile matter is removed from inside the mold. The mold is then disassembled by unscrewing each component section, leaving a dry porous block consisting of fibers, binder polymer and air. The block is composed of fibers all of which run essentially parallel to each other, the block having a fiber density of 2.5 lbs./cu. ft. and a binder density of 0.08 lb./cu. ft. The block is passed through a horizontal band knife such that the knife blade passes perpendicular to the direction of the fibers in the block, and sheets $\frac{7}{16}$ and $\frac{3}{8}$ inch thick are obtained. Each sheet is dry, flexible, porous, self-supporting, has very good cohesion and when handled and wrapped around a 2 inch and 1 inch diameter cylinder, respectively, there is no splitting or loss of fibers. The flexible sheet is further characterized by the properties given in Table I.

*Table I*

| | |
|---|---|
| Thickness (inches) | 0.25 |
| Tensile strength (lbs./in./oz./yd.$^2$) | 0.029 |
| Binder (percent by wt. of fiber) | 10.8 |
| Elongation (percent) | 16 |
| Air (percent by volume) | 96.4 |
| Flexural rigidity (g.-cm.) | 6.8 |

One of the $\frac{1}{4}$ inch sheets is cemented to a stiffened backing material (i.e. a rubber impregnated cellulosic sheet 0.030 inch thick) using a neoprene base adhesive. The terpolymer binder is then removed by immersing the whole assembly in 80/20 alcohol/water mixture for several minutes, then scouring at the boil. The resulting assembly is especially useful as a pile carpet because of its softness, resiliency, and high covering power hiding the backing material.

EXAMPLE II

A mold 10" x 10" x 12" is filled with about 25 layers of a steam bulked sheet of yarns as described in Example I. After trimming excess fiber protruding from the mold, the top and bottom is fitted in place. This block of fibers is then soaked in the same manner as in Example I with a 4.5% solution of the same polyamide terpolymer as used in Example I, dissolved in an 80/20 by volume mixture of ethanol and water. After draining the excess binder solution, hot air (300° F.) is blown through the mold to remove all volatile materials. The mold is disassembled and there is removed a bonded block of parallel oriented fibers having a fiber density of 1.3 lbs./ft.$^3$, a binder density of 0.16 lbs./ft.$^3$ and air space consisting of 97.9% by volume.

This block is sliced across the top, perpendicular to the direction of the fibers, to give sheets in thicknesses of $\frac{3}{4}$, $\frac{3}{8}$, $\frac{1}{4}$ and $\frac{3}{16}$ inch in which the fibers are essentially all oriented perpendicular to the plane of the cut. These sheets are dry, porous and self-supporting and when wrapped and unwrapped around 2, 1, $\frac{3}{8}$ and $\frac{1}{4}$ inch diameter mandrels, respectively, there is no splitting or loss of fibers. The distribution of fiber and binder throughout the sheet is uniform.

A $\frac{1}{4}$ inch sheet so obtained is found to contain 9.3% of binder based on the fiber weight and has a tensile strength of 0.036 lb./in./oz./yd.$^2$, elongation of 35% and flexural rigidity of 1.5 gm.-cm. A $\frac{1}{4}$ inch sheet so obtained is cemented to a flexible backing material, washed in ethanol/water (80/20) to remove the binder and then dyed with an acid type dyestuff to give a soft, resilient red pile floor covering.

EXAMPLE III

A block of parallelized steam bulked fibers bonded with polyamide terpolymer binder is made by the same method as shown in Example II, except that less fiber is used. This bonded block after drying is found to have a fiber density of 0.94 lb./ft.$^3$, binder density of 0.20 lb./ft.$^3$ and contains 98.4% air by volume. A $\frac{1}{2}$ inch thick sheet is sliced from this block perpendicular to the direction of the yarn axis with a rotating band knife slitter. This very porous self-supporting sheet contains 15.1% binder (on wt. of fiber), has a tensile strength of 0.015 lb./in./oz./yd.$^2$, elongation of 34% and flexural rigidity of 0.6 gm.-cm., and when wrapped and unwrapped around a 1 inch diameter mandrel, there is no splitting or loss of fibers.

A 1 inch thick sheet of this material is cemented to a fabric backing material with a neoprene base adhesive and the binder is removed by rinsing several minutes in ethanol/water (80/20). This product, after dyeing with an acid dyestuff, has a very soft fleece-like handle and contains 11.6 oz./yd.$^2$ of pile fiber.

EXAMPLE IV

A sheet of yarns consisting of a random mixture of 80 ends of continuous filament polyhexamethylene adipamide (1000 denier, 68 filaments, $\frac{1}{2}$ Z twist, the filaments of which have a Y cross section) and 40 ends of the same filament composition (1000 denier, 68 filaments, $\frac{1}{2}$ Z twist, except the filaments have a round cross section) are bulked in a steam jet using the same conditions given in Example I. This bulked yarn was then used to make a 10" x 10" x 12" block of parallelized fibers and bonded with the polyamide terpolymer of Example I by using a 4% solution of the polyamide terpolymer of Example I in ethanol/water (80/20) as described in Example I. This block has a fiber density of 3.0 lb./ft.$^3$, a binder density of 0.06 lb./ft.$^3$ and contains 95.6% air by volume.

Bonded fiber sheets ranging in thickness from $\frac{1}{4}$ to $\frac{1}{2}$ inch are sliced from this block by passing it through a rotating band knife such that the plane of the cut is 90° to the direction of the axis of the parallelized fibers. A $\frac{7}{16}$ inch thick sheet is found to contain 2.6% binder based on the fiber weight and when wrapped and unwrapped around a 2 inch diameter mandrel, there is no splitting or loss of fibers. This sheet is porous, self-supporting, sufficiently flexible and strong to be handled without damage, and has a tensile strength of 0.012 lb./in./oz./yd.$^2$, elongation of 21% and a flexural rigidity of 7.0 gm.-cm.

A $\frac{7}{16}$ inch sheet of this bonded fiber is cemented to a flexible rubber impregnated cellulosic board with a neoprene base adhesive, rinsed with ethanol to remove the binder and then dyed with an acid dyestuff. The pile floor covering obtained is soft, resilient and has a textured surface appearance due to the different types of yarn used. The adhesion of the pile fiber to the backing is very good, and the carpet shows negligible pilling in both a floor test and a carpet pilling test where it was tumbled for 10 hours with wooden blocks in a rubber lined tumble type washer.

A $\frac{7}{16}$ inch thick sample of this sheet cemented to backing material as above and then dyed at the boil with an acid dyestuff without removing the binder is found to be resilient and only slightly stiffer than the sample in which the binder was removed with alcohol.

EXAMPLE V

Polyhexamethylene adipamide crimped staple fiber 15 d.p.f. (denier per filament), 5½ inches long is processed into a carded sliver of about 225 grains. This sliver is then placed in a 10" x 10" x 12" mold as described in Example I so that the fibers are essentially all oriented parallel to the sides and perpendicular to the top and bottom of the mold. As in Example I, this fiber is then soaked with a 5% solution of the polyamide terpolymer of Example I dissolved in ethanol/water (80/20), the excess binder solution drained and the block of fibers dried with hot air (212° F.) until all the volatiles are removed. The well bonded block of parallelized fibers obtained after removing the mold has a fiber density of 6.1 lbs./ft.$^3$, binder density of 0.1 lbs./ft.$^3$ and contains 91.3% air by volume.

Thin self-supporting dry porous bonded fiber sheets, in which the fibers are essentially all perpendicular to the plane of the sheet, are obtained by passing the bonded block through a horizontal band knife cutter such that the plane of the cut is perpendicular to the axis of the parallelized fibers. Such a sheet $\frac{1}{4}$ inch in thickness is found to contain 5.0% binder based on the fiber weight and has the follownig properties: tensile strength=0.034 lbs./in./oz./yd.$^2$, elongation 12% and flexural rigidity=

11.7 gm.-cm. These thin sheets are wrapped and unwrapped around a ¾ inch diameter cylinder without splitting or loss of fibers.

A 1 gram sample selected at random from a ¼ inch thick fiber sheet as described above is placed in 500 ml. of an ethanol/water (80/20) mixture and allowed to stand 10 minutes to dissolve the binder. The loose fibers are then filtered out onto a piece of black velvet fabric and air dried. One hundred thirty-five individual fibers, picked at random from the fibers on the filter with a pair of tweezers, are placed separately on a glass lantern slide freshly coated with rubber cement. A one-inch scale is also placed on the lantern slide and another clear glass lantern slide is placed 1/16 inch above the first slide by means of paper spacers at the edges. The fibers and scale in this assembly are then magnified about 4 times and photographed. The length of each individual fiber in the photograph is measured from end to end by means of a scale calibrated with the 1 inch scale in the photograph. The distribution of these fibers in various length ranges is shown in the following table:

*Table II*

| Fiber Length Ranges (inches) | Number of Fibers in Each Range | Percent of Population in Each Length Range |
|---|---|---|
| .266–.281 | 1 | .75 |
| .250–.265 | 19 | 14.00 |
| .234–.249 | 79 | 58.50 |
| .289–.233 | 27 | 20.00 |
| .203–.238 | 3 | 2.25 |
| .188–.202 | 2 | 1.50 |
| .172–.187 | 1 | 0.75 |
| .156–.171 | 1 | 0.75 |
| .141–.155 | 0 | 0.00 |
| .125–.140 | 0 | 0.00 |
| .109–.124 | 1 | 0.75 |
| .094–.108 | 0 | 0.00 |
| .078–.095 | 1 | 0.75 |
| Total | 135 | 100.00 |

Mean fiber length=0.238 inch.
1.2 × mean fiber length=.286 inch.
0.8× mean fiber length=.191 inch.

From these data, the mean fiber length is calculated to be 0.238 inch. No fibers are longer than 1.2 times the mean fiber length and 3% of the fibers are shorter than 0.8 times the mean fiber length. (Ninety-seven percent of the fibers varied from the mean fiber length by no more than 20%.)

EXAMPLE VI

The same polyamide staple fiber as used in Example V carded into a 15 grain/yd. sliver is packed into a 10″ x 10″ x 12″ mold so that the fibers are essentially all parallel. The fibers are impregnated with a 4.5% by weight solution of the polyamide terpolymer of Example I in ethanol/water (80/20 by volume) as in Example V. After excess binder is drained off and the block dried with hot air to remove the binder solvent, there is obtained a bonded block of parallelized fibers having a fiber density of 16.0 lbs./ft.$^3$, a binder density of 0.46 and containing 77% air by volume. This bonded block of fibers is readily cut with a band knife cutter into ¼ inch thick sheets of parallel fibers in which the fibers are oriented substantially perpendicular to the plane of the cut. These sheets are dry, porous, self-supporting, flexible and when wrapped and unwrapped around a 4 inch mandrel, there is no splitting.

A ¼ inch thick sheet is found to contain 3.9% binder based on the weight of the fiber and have a tensile strength of 0.016 lbs./in./oz./yd.$^2$, an elongation of 7% and a flexural rigidity of 21.7 gm.-cm. Such a ¼ inch sheet cemented to a rubber impregnated cellulosic sheet is washed in ethanol/water (80/20) to remove the binder to give a soft resilient high density cut pile carpet.

EXAMPLE VII

A tow of 15 d.p.f. polyhexamethylene adipamide monofilaments (making 120,000 denier tow) is placed in a mold as in Example VI and the parallelized fibers are impregnated with a 4.5% solution of the polyamide terpolymer of Example I in ethanol/water (80/20). After removing excess binder, the block of fibers is dried by passing hot dry air through the fibers as in the previous example. This bonded block of fibers has a fiber density of 31.2 lbs./ft.$^3$ and contains 45% air by volume, and a binder density of 7.9 lbs./ft.$^3$.

This block is sliced at 90° to the direction of the fibers with a horizontal band knife with a scalloped edge to five ⅜ inch thick sheets having a tensile strength of 0.425 lbs./in./oz./yd.$^2$ and a break elongation of 5%. A ½ inch thick sheet so obtained is wrapped and unwrapped around a 12 inch mandrel without splitting or loss of fibers.

EXAMPLE VIII

Crimped 15 d.p.f. polyamide staple fiber (the same as that of Example V except 3 inches long) is carded into sliver having good parallelization of fibers and about 100 grains of fiber per yarn of sliver. This sliver is used to fill a 10″ x 10″ x 12″ metal mold so that the fibers are essentially all oriented parallel to the sides of the mold as in Example I. The excess fiber protruding from the mold is then trimmed off and screens of perforated metal placed over the fiber. The gasketed top and bottom are clamped into place as in Example I. The fibers are then soaked with an aqueous chloroprene latex (50% solids), to which is added 5% zinc oxide and 2% of a standard rubber antioxidant based on the weight of rubber solids, by sucking the latex at room temperature up through the bottom inlet and through the fibers in the mold by means of suction applied at the top outlet tube. After completely filling the mold, the latex is allowed to drain out the bottom by gravity and the last remaining excess is removed by applying suction at the bottom of the mold. Then hot compressed air (212° F.) is forced through the mold from the bottom until all the volatiles in the mold are removed. The mold is disassembled and the dry bonded block of fibers is removed. The fiber density of this block is 5.0 lbs./ft.$^3$, the binder density is 4.7 lbs./ft.$^3$ and the block contains 86% air by volume. The distribution of both the binder and fibers are very uniform within the block.

Thin sheets of bonded fiber 1/16 inch and greater in thickness are readily cut from this block by passing it through a horizontal band knife slicer such that the plane of the cut was 90° to the direction of the parallelized fiber axis. These sheets are dry, soft, porous, self-supporting and quite flexible and are wrapped around a 3/16 inch diameter cylinder without splitting. A sheet ⅛ inch thick is found to have a tensile strength of 0.165 lb./in./oz./yd.$^2$, a break elongation of 42% and a flexural rigidity of 3.6 gm.-cm. and when wrapped and unwrapped around a ¼ inch mandrel, there is no splitting or loss of fibers.

A ⅛ inch thick sheet of this bonded fiber is cemented to a sheet of rubber impregnated cellulosic sheet using a thin coating of neoprene based adhesive. The adhesion of the fiber to the backing material is excellent. This sample is then dyed with an acid type dyestuff used for polyamide dyeings to a uniform and even shade, the resulting soft pile structure being resilient and useful as a floor covering. This material is easily embossed to give a sharp and permanent pattern by pressing the surface with a patterned embossing roll at 300° F. for 60 seconds. Abrasion tests with a Taber abrasion wheel show these samples to have very good abrasion resistance.

EXAMPLE IX

Crimped polyamide staple fiber (same as Example V except 3 d.p.f., 1½ inches long), carded into a 100 grains/yd. sliver, is used to fill a mold as in Example VIII. These parallelized fibers are then bonded in the same manner as the previous example with aqueous chloroprene latex. The dry bonded block has a very uniform distribution of fiber and binder and a fiber density of 7.6 lbs./ft.$^3$, a binder density of 3.6 lbs./ft.$^3$ and contained 85% air by volume. This block is readily cut into very thin bonded fiber sheets having the fibers essentially all perpendicular to the plane of the sheet by passing the block through a horizontal band knife slicer such that the plane of the cut is 90° to the direction of the fibers. Sheets of thicknesses $\frac{3}{32}$ and $\frac{1}{16}$ inch were self-supporting and showed no splitting or loss of fibers when wrapped and unwrapped 360° around $\frac{1}{4}$ and $\frac{3}{16}$ inch diameter cylinders, respectively. A bonded sheet 0.020 inch thick of these fibers is dry, porous and flexible with a flexural rigidity of 8.9 gm.-cm.

A sheet 0.06 inch thick is cemented to a piece of plain weave polyamide fabric (1.9 oz./yd.$^2$) by applying a layer of neoprene based adhesive to one face of each of the bonded fiber sheet and the backing fabric. The adhesion of the fibers in the bonded sheet to the backing is very good, the product has a soft suede-like hand, and is flexible and strong. The surface has good resistance to scuffing when abraded with a pencil eraser. The surface of such a sheet is readily embossed to give sharply defined patterns that were permanent by pressing with an embossing plate heated to 350° F. for 30 seconds.

EXAMPLE X

A molded block of parallelized fibers is made in the same manner as described in Example VIII, using a 225 grain sliver of the same staple polyamide fiber (15 d.p.f., 5½ inches length) and a binder consisting of the same 50% solids chloroprene latex compounded with 7.5% zinc oxide, 3% rubber antioxidant, and 11% of 4-methyl-m-phenylene diisocyanate blocked with two mols of phenol per mol of isocyanate, these compounding agents being based on the weight of rubber solids in the latex. After the excess latex is drained from the block, it is dried with hot (176° F.) dry air. There is obtained a well bonded block of parallelized fibers having a fiber density of 7.3 lbs./ft.$^3$, a binder density of 1.8 lbs./ft.$^3$ and containing 87.5% air by volume. Self-supporting, dry, porous, and flexible fiber bonded sheets ranging in thickness from $\frac{1}{8}$ inch to 1 inch are readily obtained by passing the block of bonded fibers through a horizontal band knife slicer so that the plane of the cut is perpendicular to the direction of the parallelized fibers. A sheet $\frac{1}{8}$ inch thick is found to have a flexural rigidity of 10.2 gm.-cm. and showed no splitting or loss of fibers when wrapped and unwrapped around a cylinder $\frac{1}{4}$ inch in diameter.

This sheet is then heated at 284° F. for 30 minutes in an oven, which results in the activation of the diisocyanate component in the binder to provide a stiffer, more highly cured sheet. This sheet cemented to a flexible rubber impregnated cellulosic backing sheet using a neoprene base adhesive gives a dimensionally strong fiber surfaced pad having good abrasion resistance useful as a buffing pad.

A $\frac{1}{4}$ inch thick bonded sheet sliced from this block is cured at 284° F. for 30 minutes in an oven and then impregnated with a 20% solution of chloroprene rubber in toluene. After excess solution is drained off, the sheet is dried in an oven to remove the solvent. There is obtained a porous, firm resilient sheet having good dimensional strength and having a fiber density of 7.3 lbs./ft.$^3$, 297% binder based on the weight of fiber, and 61.3% air by volume. This sheet has properties suitable for use as an abrasion resistant shoe sole or heel.

EXAMPLE XI

A 10" x 10" x 12" bonded block of parallelized fibers is made as in Example I using carded sliver of 1 d.p.f., 2.5 inch long staple fiber (made of a terpolymer of 94% acrylonitrile, 5.6% methyl acrylate and 0.4% sodium styrenesulfonate) and a 5% solution by weight of the polyamide terpolymer binder of Example 1 dissolved in ethanol/water (80/20 by volume). This block has a fiber density of 4.4 lbs./ft.$^3$, a binder content of 39% based on the weight of the fiber and contains 91% air by volume. Sheets of bonded fiber ½ inch to 1 inch thick are cut by passing this block through a band knife slicer, such that the plane of the cut is perpendicular to the direction of the slice. A sheet ½ inch thick is self-supporting and has sufficient cohesion and strength to be coated with a layer of neoprene base adhesive and to be cemented to a polyamide tricot fabric. After removal of the binder by rinsing several minutes in ethanol and scouring in hot 0.5% soap solution there is obtained, after drying, a soft, flexible, drapeable pile fleece suitable for coat innerliners. The adhesion of the pile fiber to the backing is quite satisfactory.

EXAMPLE XII

A 6" x 6" x 6" block of bonded parallelized fiber is made as shown in Example XI using the same polyamide staple fiber (3 d.p.f., 1.5 inches long) as that in Example IX, carded into about a 100 grain sliver and a 5% solution of the polyamide terpolymer of Example I in ethanol/water (80/20). This porous bonded fiber block has a fiber density of 4.9 lbs./ft.$^3$, a binder density of 0.15 lbs./ft.$^3$ and contains about 93% by volume of air. Thin sheets of bonded parallel fibers oriented perpendicular to the plane of the sheet are readily sliced by passing the block through a horizontal band knife slicer transverse (90°) to the direction of the fibers. Such a sheet ¼ inch thick is dry, porous, self-supporting and has a tensile strength of 0.396 lb./in./oz./yd.$^2$ and a break elongation of 12%.

A sample of ¼ inch thick sheet is cemented to a polyamide tricot fabric with neoprene based adhesive. The polyamide terpolymer binder is removed by rinsing for 5 minutes in ethanol and the sample is washed in 0.5% aqueous soap solution and dried. This sample has a soft fleece-like handle and is dimensionally strong and flexible enough to have moderately good drape. This sheet did not split or lose fibers when wrapped 360° around a 3 inch diameter cylinder, and then unwrapped. Sheets ½ and ⅛ inch thickness likewise did not split or lose fibers when wrapped and unwrapped around cylinders of 5 and 1 inch diameter, respectively.

EXAMPLE XIII

A light weight web of parallelized fibers is made by carding a blend of the same 3 d.p.f. polyamide staple fiber as that of Example IX, said blend consisting of 65% of 0.5 inch long staple and 35% of 1.5 inches long staple. This web is cut into pieces approximately 3½ inches by 9 inches and about 300 of these pieces are stacked in a perforated metal cage 3½ inches wide x 6 inches high x 6¾ inches long, so that the fibers are all perpendicular to the open ends of the cage. After the top is fitted into place, the excess fiber protruding from the ends of the cage is trimmed off. This cage of fibers is immersed in a 5% aqueous solution of partially hydrolyzed polyvinyl acetate for about 10 minutes. After removing the cage from the bath, the excess binder is removed by applying a suction at one end of the block and hot air is passed through the block end to end until the block is dry. After removing the cage, there is obtained a porous bonded block of parallelized fibers having a fiber content of 4.9 lbs./ft.$^3$, a binder density of 0.98 lb./ft.$^3$, and containing 92% air by volume.

Thin bonded sheets of fiber which are self-supporting and easily handled without damage are readily obtained by passing the block through a circular knife cutter at an angle transverse to the direction of the fibers. A sheet ½ inch thick, obtained by cutting such that the fibers are perpendicular to the plane of the sheet, is cemented to a 100% polyhexamethylene adipamide paper web weighing 1.5 oz./yd.² using neoprene base adhesive. This sample is then washed in water to remove the binder. The resulting pile fiber is then combed and brushed to remove the shorter (0.5 inch) lengths of fiber that are not cemented to the backing to provide a soft fur-like product having long and short pile fibers similar to natural furs.

A ½ inch thick sheet obtained by cutting across the bonded block at a 45° angle to the direction of the fibers is cemented to backing material as above. After removing the binder by washing in water and drying, this sheet is combed and brushed to remove any loose fibers. The resulting soft fur-like product has a nap such that the fibers lay down better in one direction than in the opposite direction, such as is exhibited by the nap of natural furs.

EXAMPLE XIV

Polyhexamethylene adipamide crimped staple fiber, 15 d.p.f., 1½ inches long is processed into a carded web 27 inches wide and weighing about ½ oz./yd., using the maximum number of worker and stripper rolls in the card to achieve a high degree of parallelization of the fibers in the machine direction. This web is continuously sprayed with a 15% by-weight solution of the polyamide terpolymer of Example I in ethanol/water (80/20 by volume) to give approximately 3% of dry binder on the weight of the fiber. A second similar carded web of parallelized fiber is laid on top of the first web and sprayed on the top side with binder as previously described. This combined web is then dried to remove the binder solvent. Three of these webs are combined, one on top of the other and conveyed vertically downward to the cutter. The webs are cut at 90° transverse to the linear direction of the webs into 12 inch wide sections by intermittently feeding the web in front of the reciprocating ram which forces the web against the horizontal band knife cutter. The cut section of fiber web is pushed into the head end of the stuffer box by the ram after each cut. The ram then retracts and another 12 inch length of fiber web is fed ahead of the ram and the cutting and compacting operation described above is repeated. In this manner, 12 inch wide sections of fiber web are compacted at the head end of the stuffer box at the rate of approximately 60 cuts per minute in such a manner that the fibers are essentially all parallel to each other and oriented perpendicular to the base of the stuffer box.

The block of fibers are continuously conveyed from the stuffer box by means of the conveyor belts driven at the rate of 6"/minute so that the fiber density in the block is about 3 lbs./ft.³. The fiber block is then passed under spray nozzles and sprayed with a 5% by-weight solution of polyamide terpolymer as in Example I, dissolved in ethanol/water (80/20 by volume). The excess binder is removed through the perforated bottom conveyor belt by gravity and air forced through the block from the top. The block is passed continuously through an oven with hot air at about 250–300° F. blowing through the block from the top to the bottom side.

The dry block of fibers is then passed continuously through a series of horizontal band knife slicers at an angle of 90° transverse to the direction of the fibers to give ½ inch thick self-supporting porous, bonded fiber sheets. The fibers in these sheets are all essentially parallel and oriented at an angle of 90° to the face of the sheets. These sheets are rolled in continuous length onto 12 inch diameter beams to give about 5 feet diameter rolls which are suitable for storage or shipping. This fibrous sheeting, having about 3 lbs./ft.³ of fiber and containing approximately 5% binder on the weight of the fiber, can be unrolled and continuously cemented to backing material. After removal of the binder by rinsing in alcohol, there is obtained a soft resilient pile floor covering.

EXAMPLE XV

Steam bulked continuous filament polyhexamethylene adipamide yarn as described in Example I is creeled into warp sheets of parallel yarns about 30 inches wide x 3 inches thick x 16 feet long. These warps are pleated into a metal mold, 30 inches long x 30 inches wide x 12 inches deep having an open top and bottom, in such a manner that the folds of the pleats extended above and below the mold and the fibers are essentially all parallel to each other and the sides of the mold. The pleated yarn protruding from the top and bottom of the mold is trimmed off, leaving approximately 20.6 lbs. of fiber in the mold. Two perforated metal screens are placed on the top and bottom of the mold and cover plates fitted with inlet and outlet pipes are attached using air tight gaskets to the top and bottom of the mold over the screens.

The fibers are then soaked in the same manner as in Example I with a 4.5% by weight solution of the terpolymer described in Example I dissolved in an 80/20 by volume mixture of ethanol and water. After draining the excess binder solution from the bottom of the mold, hot air at 300° F. is blown through the block from top to bottom until all the volatile solvent is removed. The mold is disassembled and there is obtained a porous bonded block of parallelized fibers having a fiber density of 3.3 lbs./ft.³ and containing about 0.83 lb./ft.³ of binder.

This block of fibers is sliced across the top at 90° to the direction of the fibers to give fiber bonded sheets about 30 inches square and 7/16 inch thick in which the fibers are essentially all perpendicular to the face of the sheet. These dry porous, self-supporting sheets are made into soft, resilient carpet samples by cementing to rubber impregnated burlap backing with a rubber base adhesive, removing the binder by washing in ethanol/water (80/20 by volume) and then dyeing with a disperse type dyestuff. One of these sheets is wrapped and unwrapped around a 2 inch mandrel and shows no loss of fibers or splitting.

The distribution of fiber lengths in a sliced sheet about 7/16 inch thick as above is determined according to the procedure described in Example V and shown in the following table.

*Table III*

| Fiber Length Ranges (inches) | Number of Fibers in Each Range | Percent of Population in Each Length Range |
|---|---|---|
| .484–.500 | 1 | 1.37 |
| .469–.483 | 1 | 1.37 |
| .453–.468 | 1 | 1.37 |
| .438–.452 | 2 | 2.74 |
| .421–.437 | 4 | 5.48 |
| .406–.420 | 7 | 9.58 |
| .391–.405 | 12 | 16.45 |
| .375–.390 | 13 | 17.79 |
| .359–.374 | 5 | 6.85 |
| .344–.358 | 8 | 10.97 |
| .328–.343 | 5 | 6.84 |
| .313–.327 | 4 | 5.48 |
| .297–.312 | 3 | 4.12 |
| .281–.296 | 5 | 6.85 |
| .266–.280 | 2 | 2.74 |
| Total | 73 | 100.00 |

Mean fiber length = .372
1.2 × mean fiber length = .447
0.8 × mean fiber length = .294

From these data, the mean fiber length is calculated to be .372 inch, 83.5% of the fibers are within 20% of the mean fiber length with 6.9% of the fibers longer than 1.2 times the mean length and 9.6% are shorter than 0.8 times the mean length.

The self-supporting fibrous sheeting of this invention may be made in a wide variety of thicknesses depending on the utility desired for the sheeting. Many of the novel and peculiar properties of the products of this invention are particularly noticeable in the thinner sheets ranging from about 0.01 to about 1 inch in thickness, particularly the thinner sheets having high fiber density. However, the fiber density, amount of binder and air volume for a given thickness of sheet should be adjusted so that the end product is porous and self-supporting. Likewise, the binder content of the sheet should be high enough to insure that the sheet be self-supporting and will not fall apart in the absence of a backing. Regardless of thickness, the sheeting is normally prepared by cutting the bonded filamentary mass at an angle transverse to the direction of the axes of the envelopes enclosing the filamentary pile members of at least 10° and preferably at 90° to the direction of said axes. The porosity of the sheets is attributable preferably to interconnecting cells of air.

To give an indication of the wide latitude of properties of and end uses for the novel sheets of this invention, some broad property limits are given in Table IV, independent of use, as well as some practically suitable property ranges for sheeting prepared from 100% polyamide solids (binder plus fiber), for the particular end uses specified.

*Table IV*

|  | Broad Uses | Specific Uses | | | |
| --- | --- | --- | --- | --- | --- |
|  |  | Carpets | Tiles | Suedes | Furs and Fleeces |
| Flexural Rigidity | 0.1–75 | 1.0–20 | 3–40 | 1–25 | 0.5–25 |
| Percent Binder (on fiber weight) | 0.5–300 | 2.5–20 | 20–100 | 40–150 | 1.5–30 |
| Fiber Density (lbs./ft.³) | 0.5–35 | 1–8 | 3–12 | 5–15 | 0.8–6 |
| Air (Percent Volume) | 25–99 | 80–99 | 70–95 | 50–90 | 80–99 |
| Tensile Strength | 0.005–1.0 | 0.015–0.3 | 0.03–0.5 | 0.04–0.5 | 0-01–0.25 |

A sheet material having particularly desirable compressive resistance and other properties is obtained when the pile members are oriented at an angle of about 90° to the plane of the sheet material, though the compressive resistance of sheets wherein the pile members are oriented at lower angles is quite suitable. These latter sheets are particularly desirable in the preparation of pile fabrics wherein the nap of the pile lays in a single direction, for example, as in synthetic furs or in fabrics used to cover conveyor belts which travel at an angle to the horizontal.

Particularly desirable products may be prepared from the self-supporting sheet material of this invention wherein the majority of the pile members vary by no more than about 20% from the mean fiber length. Pile rugs, tile and the like may be prepared from such sheets so as to have a highly desirable uniform surface, as well as decreased piling characteristics, due to the absence of pile members substantially longer than the remainder of the pile.

The sheeting of this invention may be treated either with or without backing material applied, by conventional operations, such as dyeing, printing, calendering, embossing, finishing, and the like. The chief advantages of the sheeting of this invention over products of the prior art lies in the fact that the structures are not only cheaper to produce and easier to handle in production and shipping but they are susceptible to being prepared and modified by known techniques to provide a wide variety of styling possibilities. By employing a blend of heat shrinkable fibers and nonshrinkable fibers, high and low pile effects may be achieved in preparing synthetic furs.

Alternatively in soft pile structures, variable pile height, such as the long guard hairs in furs, can be obtained by using a blend of short and long fiber lengths in the fiber web. After dissolving out the binder from a wafer bonded to backing, the short fibers that are not bonded to the backing can be brushed out to develop a wearable pile fiber height. Where a soluble binder is used, carved effects can be achieved. After dissolving out the soluble binder, the design may be developed by brushing. Furthermore, mixtures of different types of fiber may be used to provide cross-dyeing possibilities. Also three dimensional embossed pattern effects may be achieved by compressing patterns into the pile using sufficient heat and pressure to force lines of pile deeply into the cement on a backing material.

The novel self-supporting sheeting of this invention also provides a greater range of fiber density and pile height than is obtainable by conventional flocking methods. The novel sheeting structures also have an additional advantage in that either or both ends of each of the parallel fibers in the final sheet is free and self-supporting, and therefore, capable of being modified structurally, physically, or chemically. The novel sheets may be used as a core member between two continuous sheets of film, fabric, and the like, for building materials, insulation, cushioning materials and the like. By leaching out the binder, the sheets may be converted to a brush.

I claim:

1. A porous, flexible, self-supporting sheet material comprising substantially parallelized crimped filamentary pile members of synthetic organic polymer, the said members being distributed throughout the sheet material and being attached at a plurality of contact points throughout the three dimensions of the sheet material, the faces of the sheet material being composed essentially of fiber ends and the air within said sheet constituting at least about 50% of its volume.

2. A porous, flexible, self-supporting sheet material of claim 1 wherein said synthetic organic polymer is a polyamide.

3. A porous, self-supporting sheet material comprising crimped filamentary pile members of synthetic polymer, a majority of said pile members being substantially parallelized, and uniformly distributed throughout the sheet at an angle to the plane of the face of the sheet greater than about 10°, said pile members being attached at a plurality of contact points throughout the three dimensions of the sheet by a binder composition, the faces of the sheet material consisting essentially of fiber ends with the majority of the filamentary pile members varying by no more than about 20% from the mean fiber length, and the air within said sheet constituting at least about 50% of its volume.

4. A porous, flexible, self-supporting sheet material comprising parallelized synthetic organic polymeric crimped filamentary pile members uniformly distributed throughout the sheet and being attached at a plurality of contact points uniformly throughout the three dimensions of the sheet by an organic binder composition, said sheet material containing at least about 0.5% binder based on the weight of the filamentary pile members, the density of these members in the sheet being between about 0.5 and 8 pounds per cubic foot, the air volume in the sheet being at least about 50%, and the faces of the said sheet material being composed essentially of fiber ends.

5. The porous, self-supporting sheet material of claim 3 wherein the said pile members are comprised of an acrylonitrile polymer.

6. The porous, self-supporting sheet material of claim 3 wherein the said pile members are comprised of a polyester.

7. A novel process comprising forming crimped synthetic organic polymeric filamentary structures into a body of substantially parallelized filamentary structures, cutting strips from said body at an angle transverse to said structures, assembling the strips into a block so that the filamentary structures are substantially parallelized, attaching the filamentary structures with a binder composition at spaced contact points throughout the three dimensions of the block, and cutting the block at an angle transverse to the parallelized fibers so that the resulting sheet-like article contains substantially parallelized filamentary structures oriented at an angle of at least about 10° to the plane of the cutting surface.

8. The process of claim 7 wherein the substantially parallelized filamentary structures are continuous filaments.

9. A porous, flexible, self-supporting sheet material of claim 4 wherein at least one of said faces has been cemented to a backing material.

10. A novel process of claim 7, wherein the body of substantially parallelized filamentary structures is a carded web of substantially parallelized staple fibers.

References Cited in the file of this patent
UNITED STATES PATENTS

| | | |
|---|---|---|
| 1,864,478 | Ward | June 21, 1932 |
| 2,130,948 | Carothers | Sept. 20, 1938 |
| 2,160,001 | Saborsky | May 30, 1939 |
| 2,373,500 | Pearce | Apr. 10, 1945 |
| 2,674,556 | Pahl et al. | Apr. 6, 1954 |
| 2,688,380 | MacHenry | Sept. 7, 1954 |
| 2,782,465 | Palmer | Feb. 26, 1957 |
| 2,854,696 | Kreibaum | Oct. 7, 1958 |
| 2,896,304 | Peroni | July 28, 1959 |
| 2,910,763 | Lauterbach | Nov. 3, 1959 |
| 2,940,504 | Jacquet | June 14, 1960 |
| 2,943,968 | Freeman et al. | July 5, 1960 |
| 2,949,953 | Di Maio et al. | Aug. 23, 1960 |
| 3,012,923 | Slayter | Dec. 12, 1961 |

UNITED STATES PATENT OFFICE
CERTIFICATE OF CORRECTION

Patent No. 3,085,922            April 16, 1963

Charles Richard Koller

It is hereby certified that error appears in the above numbered patent requiring correction and that the said Letters Patent should read as corrected below.

Column 5, line 7, for "altternative" read -- alternative --; column 14, Table III, first column heading, for "Fiber Length Ranges (inches)" read -- Fiber Length Range (inches) --; column 15, Table IV, right-hand column, last line thereof, for "0-01-0.25" read -- 0.01-0.25 --; column 16, line 40, after "synthetic" insert -- organic --.

Signed and sealed this 19th day of November 1963.

(SEAL)
Attest:

ERNEST W. SWIDER

Attesting Officer

Commissioner of Patents